(12) United States Patent
Carera et al.

(10) Patent No.: US 9,559,500 B2
(45) Date of Patent: Jan. 31, 2017

(54) ELECTRICALLY INSULATING SHELL, AN ELECTRICALLY INSULATING DEVICE COMPRISING SUCH INSULATING SHELL, AND RELATED SWITCHGEAR PANEL

(71) Applicant: ABB Technology AG, Zürich (CH)

(72) Inventors: David Carera, Treviolo (IT); Fabio Pellegrini, Bergamo (IT)

(73) Assignee: ABB Schweiz AG, Baden (CH)

( * ) Notice: Subject to any disclaimer, the term of this patent is extended or adjusted under 35 U.S.C. 154(b) by 68 days.

(21) Appl. No.: 14/560,625

(22) Filed: Dec. 4, 2014

(65) Prior Publication Data

US 2015/0171603 A1 Jun. 18, 2015

Related U.S. Application Data

(63) Continuation of application No. PCT/EP2013/059851, filed on May 13, 2013.

(30) Foreign Application Priority Data

Jun. 8, 2012 (EP) ..................................... 12171309

(51) Int. Cl.
*H02B 11/04* (2006.01)
*H01B 17/26* (2006.01)
(Continued)

(52) U.S. Cl.
CPC ................ *H02B 1/14* (2013.01); *H01B 17/26* (2013.01); *H02B 11/04* (2013.01); *H02G 5/06* (2013.01)

(58) Field of Classification Search
CPC .......... H01B 17/26; H02B 11/04; H02G 5/061
See application file for complete search history.

(56) References Cited

U.S. PATENT DOCUMENTS 1,797,936 A 3/1931 Auringer
2,469,445 A * 5/1949 Scott, Jr. ................ H02G 5/061
174/99 B
(Continued)

FOREIGN PATENT DOCUMENTS

CN 2935509 8/2006
DE 3328785 A1 * 2/1985 ........... H01B 17/005
(Continued)

OTHER PUBLICATIONS

International Search Report (PCT/ISA/210) mailed on Jun. 28, 2013, by the European Patent Office as the International Searching Authority for International Application No. PCT/EP2013/059850.
(Continued)

*Primary Examiner* — Robert J Hoffberg
(74) *Attorney, Agent, or Firm* — Taft Stettinius & Hollister LLP

(57) ABSTRACT

An electrically insulating shell is disclosed, which includes a first half shell and a second half shell devised to be mutually connected together and shaped so as to define, once connected together, a central part delimiting a substantially closed space, which will encase a corresponding first portion of an associated electrical conductor. A first hollow portion protrudes from a first side of the central part, the first hollow portion being in communication with an inner space of the closed central part and adapted to surround a corresponding second portion of the electrical conductor. A second hollow portion protrudes from the central part from a second side opposite to the first side, the second hollow portion being in communication with the inner space of the closed central part and adapted to surround a corresponding third portion of the electrical conductor.

16 Claims, 6 Drawing Sheets

(51) Int. Cl.
*H02B 1/14* (2006.01)
*H02G 5/06* (2006.01)

(56) References Cited

U.S. PATENT DOCUMENTS

| | | | | |
|---|---|---|---|---|
| RE23,811 E | * | 3/1954 | Scott, Jr. | ............... H02G 5/061 |
| | | | | 174/99 B |
| 2,875,265 A | * | 2/1959 | Albright | ............... H02G 5/061 |
| | | | | 174/99 B |
| 3,020,329 A | * | 2/1962 | Deans | ............... H02G 5/061 |
| | | | | 174/16.2 |
| 3,662,137 A | | 5/1972 | Cleaveland | |
| 4,723,917 A | | 2/1988 | Cournet et al. | |
| 4,818,822 A | | 4/1989 | Yahraus | |
| 7,724,146 B2 | * | 5/2010 | Nguyen | ............ E05B 73/0017 |
| | | | | 340/5.61 |
| 8,681,481 B2 | * | 3/2014 | Patten | ................... H02B 11/04 |
| | | | | 312/223.6 |
| 2012/0182669 A1 | * | 7/2012 | Patten | ................... H02B 11/04 |
| | | | | 361/637 |
| 2014/0120347 A1 | * | 5/2014 | Neumaier | ............ H02G 15/107 |
| | | | | 428/375 |
| 2015/0087177 A1 | * | 3/2015 | Carera | ................... H02B 11/04 |
| | | | | 439/339 |

FOREIGN PATENT DOCUMENTS

| | | |
|---|---|---|
| EP | 0880208 A1 | 11/1998 |
| EP | 1962397 A1 | 8/2008 |
| EP | 2148403 A1 | 1/2010 |
| EP | 2405545 A1 | 1/2012 |
| FR | 2214185 A1 | 8/1974 |
| FR | 2903241 | 11/2006 |
| FR | 2903241 A1 * | 1/2008 |
| WO | WO 2011/061579 A1 | 5/2011 |

OTHER PUBLICATIONS

Written Opinion (PCT/ISA/237) mailed on Jun. 28, 2013, by the European Patent Office as the International Searching Authority for International Application No. PCT/EP2013/059850.
International Search Report (PCT/ISA/210) mailed on Jun. 28, 2013, by the European Patent Office as the International Searching Authority for International Application No. PCT/EP2013/059849.
Written Opinion (PCT/ISA/237) mailed on Jun. 28, 2013, by the European Patent Office as the International Searching Authority for International Application No. PCT/EP2013/059849.
International Search Report (PCT/ISA/210) mailed on Jun. 28, 2013, by the European Patent Office as the International Searching Authority for International Application No. PCT/EP2013/059851.
Written Opinion (PCT/ISA/237) mailed on Jun. 28, 2013, by the European Patent Office as the International Searching Authority for International Application No. PCT/EP2013/059851.
Englished Translation of Chinese Office Action; Chinese Patent Office: Chinese Patent Application No. 201380030146.4, Dec. 28. 2015, 8 pgs.

* cited by examiner

ELECTRICALLY INSULATING SHELL, AN ELECTRICALLY INSULATING DEVICE COMPRISING SUCH INSULATING SHELL, AND RELATED SWITCHGEAR PANEL

RELATED APPLICATION(S)

This application is a continuation of International Application No. PCT/EP2013/059851 filed on May 13, 2013, and claims priority to European Patent Application No. 12171309.3 filed on Jun. 8, 2012, the entire content of both of which is incorporated herein by reference.

FIELD

The present disclosure relates to an electrically insulating shell, an electrically insulating device including such insulating shell, and related switchgear panel.

BACKGROUND INFORMATION

The electrically insulating shell and related electrically insulating device according to the present disclosure can be suitable for use inside the cabinet of electric switchgear panels, for example, when retrofitting existing switchgear panels, and will be described in reference to such applications, without intending however to limit their broader applications.

The use of electrically insulating devices is known in the field of electricity.

Such insulating devices can electrically insulate the conductor to which they are associated from the surrounding environment. In addition, depending on the specific applications, they can provide a good mechanical robustness and/or thermal stability for a long lifetime.

Further, insulating devices should also have a whole structure, which can be relatively inexpensive to produce, relatively easy to install, and relatively flexible, for example, adaptable to different configurations without incurring substantial or cumbersome modifications.

These latter specifications can play an important role when insulating devices have to be installed inside the cabinet of switchgear panels since more than one insulating device is usually needed, the space available can be limited, and the distance between conductive parts can be rather short.

These aspects can be important when retrofitting an existing switchgear panel. For example, in these cases, when instead of replacing the entire switchgear panel, a user replaces only the existing circuit breaker with a new and different one, a problem of compatibility can arise for example between the new circuit breaker to be used and the structural and/or functional characteristics of the existing switchgear panel. For example, the distance between the pre-existing contact pieces of the electric circuit into which the circuit breaker has to be inserted can be totally different and unsuitable with respect to the distance of the corresponding input and output connection contacts of the circuit breaker; hence, the installer should form "ad hoc" paths for electrically connecting each contact of the circuit breaker to the respective contact piece of the associated circuit.

For example, an insulating device should have first a structure adapted to be applied to the specific conductive path to which is it associated. However, for a greater market appeal, the insulating device should have its own structure applicable to different paths at least within the same cabinet and can fit within limits and constraints imposed by the surrounding parts of the panel, without needing substantial modifications to the structure.

SUMMARY

An electrically insulating shell is disclosed, which is suitable to be operatively associated to an electrical conductor, the electrically insulating shell comprising: a first half shell and a second half shell arranged to be mutually connected together and shaped so as to define, once connected together, a closed central part delimiting a substantially closed space, which will encase a corresponding first portion of an electrical conductor; a first hollow portion for protruding from a first side of the central part, such that the first hollow portion will be in communication with an inner space of the closed central part and adapted to surround a corresponding second portion of the electrical conductor; and a second hollow portion for protruding from the central part from a second side opposite to the first side, such that the second hollow portion will be in communication with the inner space of the closed central part and adapted to surround a corresponding third portion of the electrical conductor.

An electrically insulating device is disclosed comprising: one or more insulating shells, the one or more insulating shells including: a first half shell and a second half shell arranged to be mutually connected together and shaped so as to define, once connected together, a closed central part delimiting a substantially closed space, which will encase a corresponding first portion of an electrical conductor; a first hollow portion for protruding from a first side of the central part, such that the first hollow portion will be in communication with an inner space of the closed central part and adapted to surround a corresponding second portion of the electrical conductor; and a second hollow portion for protruding from the central part from a second side opposite to the first side, such that the second hollow portion will be in communication with the inner space of the closed central part and adapted to surround a corresponding third portion of the electrical conductor; and an insulating plate having a central part perforated with one or more holes inside, and wherein each of the one or more holes is configured for the second portion of a corresponding insulating shell to be inserted.

A switchgear panel is disclosed comprising: a cabinet; a circuit breaker positioned inside the cabinet and configured to be electrically connected via an input and an output to an associated electrical circuit along electrical connection paths each formed by one or more conductive pieces; at least one electrically insulating shell, the at least one electrically insulating shell including: a first half shell and a second half shell arranged to be mutually connected together and shaped so as to define, once connected together, a closed central part delimiting a substantially closed space, which encases a corresponding first portion of an electrical conductor; a first hollow portion for protruding from a first side of the central part, such that the first hollow portion will be in communication with an inner space of the closed central part and adapted to surround a corresponding second portion of the electrical conductor; and a second hollow portion for protruding from the central part from a second side opposite to the first side, such that the second hollow portion will be in communication with the inner space of the closed central part and adapted to surround a corresponding third portion of the electrical conductor; and wherein the at least one insulating shell is arranged to be operatively positioned along one of the electrical connection paths so as to electrically insulate at least a portion of the path from the surrounding environment.

A switchgear panel is disclosed comprising: a cabinet; a circuit breaker positioned inside the cabinet and having a plurality of connection contacts suitable to be electrically connected each to a corresponding contact piece of an associated electrical circuit along a respective connection path formed by one or more conductive pieces; and an electrically insulating device, the electrically insulating device including: one or more insulating shells, the one or more insulating shells including: a first half shell and a second half shell arranged to be mutually connected together and shaped so as to define, once connected together, a closed central part delimiting a substantially closed space, which will encase a corresponding first portion of an electrical conductor; a first hollow portion for protruding from a first side of the central part, such that the first hollow portion will be in communication with an inner space of the closed central part and adapted to surround a corresponding second portion of the electrical conductor; and a second hollow portion for protruding from the central part from a second side opposite to the first side, such that the second hollow portion will be in communication with the inner space of the closed central part and adapted to surround a corresponding third portion of the electrical conductor; and an insulating plate having a central part perforated with one or more holes inside each of which the second portion of a corresponding insulating shell is suitable to be inserted; and wherein the insulating plate includes one or more side walls which will protrude transversally from the central part, and which are mechanically connected to a further component of the switch gear panel.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

Figure 1:
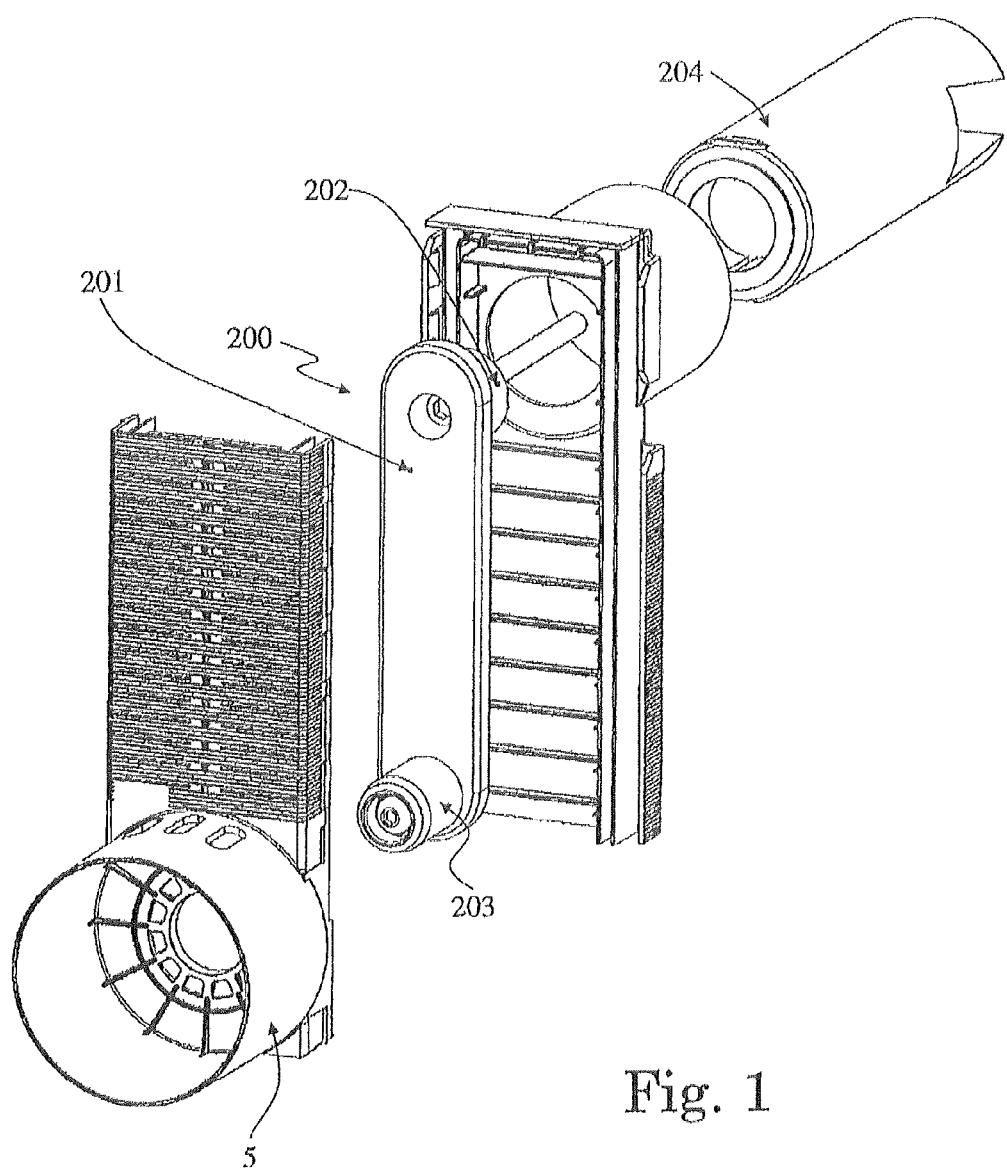
FIG. 1 is a perspective view showing an exemplary insulating shell according to the present disclosure under assembling with an associated conductor.

In accordance with an exemplary embodiment, the present disclosure provides an electrically insulating shell suitable to be operatively associated to an electrical conductor including one or more pieces connected together, which can include a first half shell and a second half shell devised to be mutually connected together and shaped so as to define, once connected together, a central part delimiting a substantially closed space encasing inside it a corresponding first portion of the electrical conductor, a first hollow portion protruding from a first side of the central part, the first hollow portion being in space communication with the inner space of the closed central part and adapted to surround a corresponding second portion of the electrical conductor, and a second hollow portion protruding from the central part from a second side opposite to the first side, the second hollow portion being in space communication with the inner space of the closed central part and adapted to surround a corresponding third portion of the electrical conductor.

In accordance with an exemplary embodiment, the present disclosure relates to an electrically insulating device, which can include one or more insulating shells and an insulating plate having a central part perforated with one or more holes inside each of which the second portion of a corresponding insulating shell is suitable to be inserted.

The present disclosure also relates to a switchgear panel including a cabinet, a circuit breaker positioned inside the cabinet and suitable to be electrically connected in input and output to an associated electrical circuit along electrical connection paths formed each by one or more conductive pieces, characterized in that it includes at least one electrically insulating shell as defined by the related appended claims and described hereinafter, the at least one insulating shell being operatively positioned along one of the conductive path so as to electrically insulate at least a portion of the path from the surrounding environment.

In accordance with an exemplary embodiment, a switchgear panel is disclosed, which can include a cabinet, a circuit breaker positioned inside the cabinet and having a plurality of connection contacts suitable to be electrically connected each to a corresponding contact piece of an associated electrical circuit along a respective connection path formed by one or more conductive pieces, and an electrically insulating device as disclosed herein, and the insulating plate of the insulating device can include one or more side walls which protrude transversally from a central part of the insulating plate and are mechanically connected to a further component of the panel.

It should be noted that in the detailed description that follows, identical or similar components, either from a structural and/or functional point of view, have the same reference numerals, regardless of whether they are shown in different embodiments of the present disclosure. In addition, it should also be noted that in order describe the present disclosure, the drawings may not necessarily be to scale and certain features of the disclosure can be shown in somewhat schematic form.

Further, when the term "adapted" is used in the following description while referring to any component as a whole, or to any part of a component, or to a whole combinations of components, or even to any part of a combination of components, it can be understood that it means and encompasses the structure, and/or configuration and/or shape and/or positioning of the related component or part thereof, or combinations of components or part thereof, such term refers to.

Figure 2:
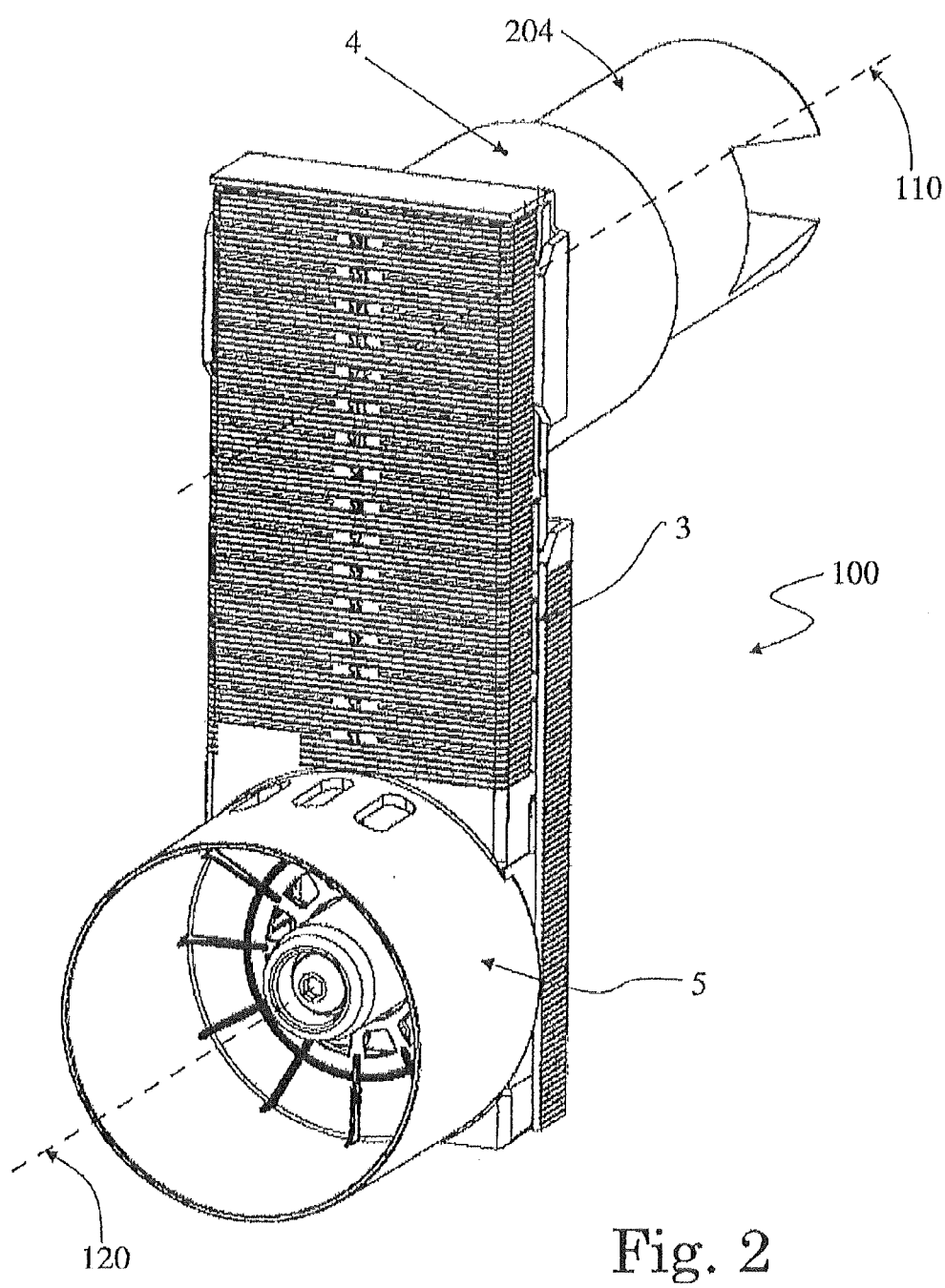
FIG. 2 is a perspective view showing an exemplary electrically insulating shell according to the present disclosure, assembled with an associated conductor.

FIGS. 1 and 2 show an electrically insulating shell 100 according to the present disclosure under assembling and assembled with an electrical conductor 200, respectively.

In accordance with an exemplary embodiment, the electrical conductor 200 can include one or more pieces connected together according to various applications. For example, the exemplary conductor 200 depicted in the attached figures, can include a first portion 201, for example link-shaped, a second portion 202, for example, cylindrical or tubular, which can protrude transversely from a first side of the first portion 201, and a third portion 203, for example tubular or cylindrical, which can protrude from a second side of the first shaped portion opposite to the first side. In accordance with an exemplary embodiment, the conductor 200 depicted in the figures can be understood only for illustrative and non-limiting purposes, for example, the shape, number, and/or the relative position of the parts can change.

In accordance with an exemplary embodiment, the insulating shell 100 can include a first half shell 1 and a second half shell 2 devised to be mutually connected together and shaped so as to define, once connected together (as illustrated in FIG. 2), a central part 3 delimiting a substantially closed space encasing inside it a corresponding first portion of the electrical conductor 200, for example the first portion 201, a first hollow portion 4 protruding transversely from a first side of the central part 3, for example at an end portion thereof. The cavity of the first hollow portion 4 can be in space communication or continuity with the inner space of the closed central part 3 and can be adapted to surround an associated second portion of the electrical conductor 200, for example the second portion 202. In accordance with an exemplary embodiment, the two shells 1 and 2 once connected define also a second hollow portion 5, which can protrude transversely from a second side opposite to the first side of the central part 3. For example and as illustrated in the figures, the second hollow portion 5 can be located at a second end of the central part 3 opposite to its first end where the first hollow portion 4 is provided. The cavity of the second hollow portion 5 can also be in space communication or continuity with the inner space of the closed central part 3 and can be adapted to surround the corresponding third portion of the electrical conductor 200, for example, the third portion 203.

In accordance with an exemplary embodiment, the insulating shell 100 can define a continuous path (formed by the cavity of the first hollow portion 4, the inner space encased by the central part 3 which can have the form of a box-like element, and the cavity of the second hollow portion 5) along and inside which a conductor is placed and electrically insulated from the surrounding environment.

In accordance with an exemplary embodiment, for example, at least one of the first half shell 1 and the second half shell 2 can include a shaped body having a plurality of reference notches 30 adapted to allow cutting away portions of the respective shaped body itself, which can allow one to easily adjust the size of the insulating shell 100, and for example, of the central part 3 of the insulating shell 100 according to the specific application.

Moreover, the first half shell 1 and the second half shell 2 can include first coupling means 6 and second coupling means 7, respectively, which can be suitable to mutually engage so as to mechanically connect each other the first half shell 1 and the second half shell 2 in a snap-fit way.

Figure 3:
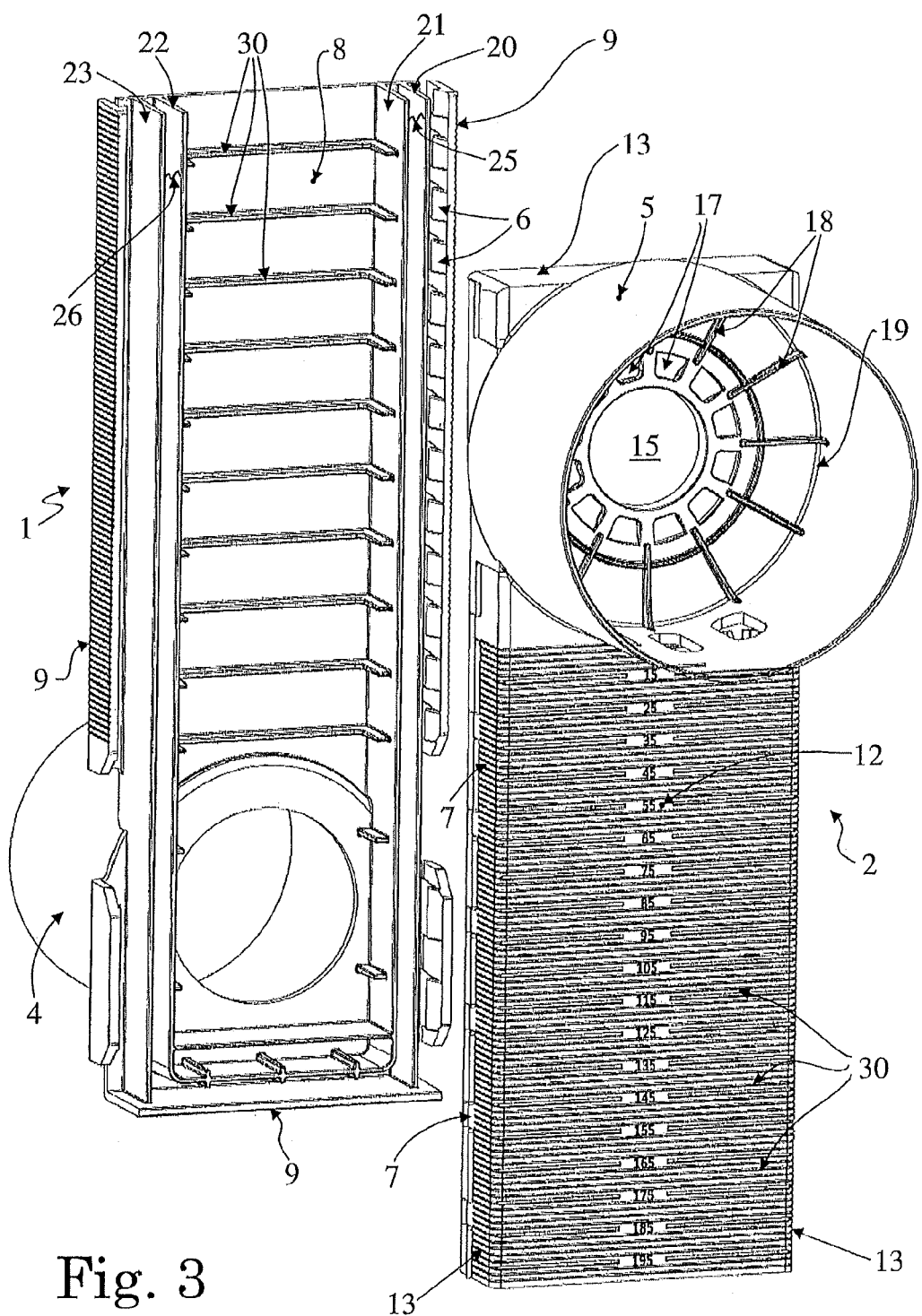
FIG. 3 illustrates components of the insulating shell of FIG. 1 disassembled and seen from different perspectives.
Figure 4:
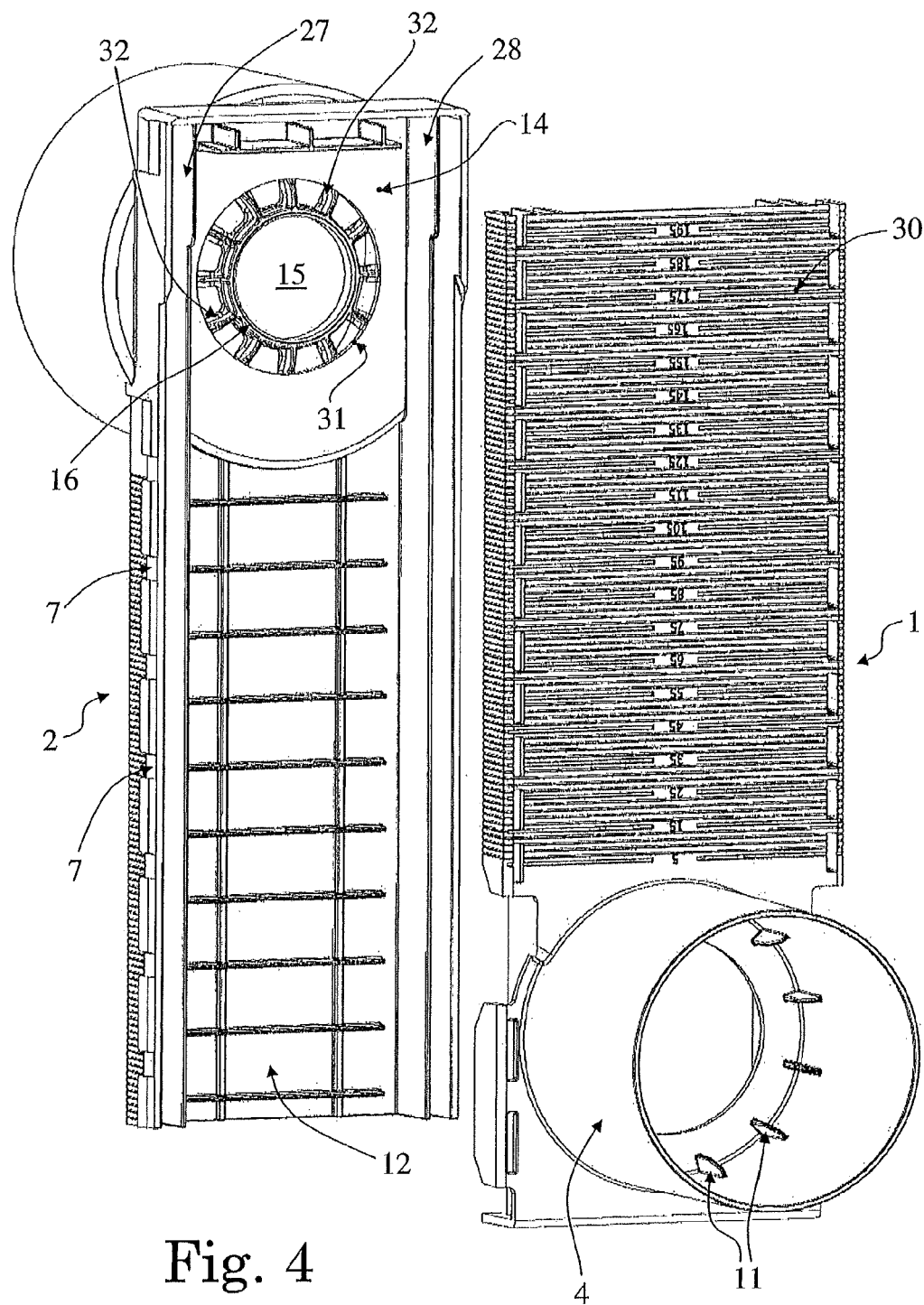
FIG. 4 illustrates components of the insulating shell of FIG. 1 disassembled and seen from different perspectives.

As illustrated in FIGS. 3 and 4, the first half shell 1 can include a shaped body having a first base wall 8, one or more first side walls 9 which protrude transversally from the first base wall 8, and a first hollow tubular portion 4 which can be made integral with and protrudes, for example, perpendicularly from the first base wall 8, along a reference axis 110, in a direction opposite from that of the one or more first side walls 9. In accordance with an exemplary embodiment, the first hollow tubular portion 4, in the exemplary embodiment illustrated, forms the first hollow portion 4 of the insulating shell 100.

The first coupling means 6 can include one or more teeth 6 provided on at least one of the one or more first side walls 9. In accordance with an exemplary embodiment, a plurality of teeth 6 can be provided on both the two vertical side walls 9.

In addition, a first plurality of reference notches 30 can be provided at least along the first base wall 8 and can be adapted to allow cutting away portions of its shaped body so as to adjust the size, and, for example, the length of the first half shell 1 measured along a direction perpendicular to the extension (for example, the reference axis 110) of the first hollow tubular portion 5.

As illustrated, such notches 30 can be indexed with reference tags ("195, "185" etc.) which can give an immediate visual indication to a user of the relative length quote of the first base wall 8.

In accordance with an exemplary embodiment, the illustrated first half shell 1 can be provided with a first plurality of centering fins 11, which can be provided on the inner surface of the first hollow tubular portion 4. The fins 11 can be devised to allow a correct position and centering of a piece of conductor which can be inserted in and coupled with the first hollow tubular portion, such as, for example, a tubular conductor 204 illustrated in FIGS. 1 and 2.

In accordance with an exemplary embodiment, the second half shell 2 can include a shaped body having a second base wall 12, one or more second side walls 13 which protrudes transversally from the second base wall 12, and a second hollow tubular portion 5 which can be made integral with and protrudes perpendicularly from the second base wall 12 along a reference axis 120, in a direction opposite from that of the one or more second side walls 13. In accordance with an exemplary embodiment, the second hollow tubular portion 5, can form the second hollow portion 5 of the insulating shell 100.

The second coupling means 7 can include one or more hooks 7, which can be suitable to engage each with a corresponding tooth 6 and can be provided on at least one of the one or more second side walls 13. In accordance with an exemplary embodiment, a plurality of hooks 7 can be provided on both the two vertical side walls 13.

In accordance with an exemplary embodiment, the second hollow tubular portion 5 of the second half shell 2 can include at the second base wall 12, a bottom wall 14 having a central part with a main hole 15 surrounded by a contour ring 16. The bottom wall 14 can be part of or additional to the second base wall 12.

In accordance with an exemplary embodiment, a plurality of secondary holes 17 can be provided circumferentially around the central main hole 15 on the outer part of the contour ring 16. A plurality of lugs 18 can run between the external rim 19 of the plurality of secondary holes 17 and a notch 31 can be provided, for example, circumferentially at the external border of the central part. The notch 31 can allow cutting away, when needed, the central part of the bottom wall including the main hole 15, the contour rim 16, the secondary holes 17 and the plurality of lugs 18. In accordance with an exemplary embodiment, there can also be additional notches 32 associated with corresponding lugs 18.

In accordance with an exemplary embodiment, for example, a larger hole for the second hollow portion 5 can be used, and which can easily adapt the insulating shell 100 to a part of conductor 203 having a bigger size.

In accordance with an exemplary embodiment, the first shell 1, also the second half shell 2 includes a plurality of reference notches 30 which can be provided at least along the second base wall 12 and can be adapted to allow cutting away portions of its shaped body so as to adjust the size, and, for example, the length of the second half shell 2 measured along a direction perpendicular to the extension (for example, the second reference axis 120) of the second hollow tubular portion 4.

Also the notches 30 provided on the second half shell 2 can be indexed with reference tags ("195, "185" etc.) which give an immediate visual indication to a user of the relative length quote of the second base wall 12.

As illustrated, the first half shell 1 can include a first insulating barrier 20, a second insulating barrier 21, a third insulating barrier 22, and a fourth insulating barrier 23 which all extend from one side of the first base wall 8 substantially parallel to each other and to the vertical first side walls 9. For example, the first and second insulating barriers 20, 21 can be positioned close to each other and spaced apart from each other of a first space 25, while the third and fourth insulating barriers 22, 23 can be positioned close to each other and spaced apart from each other of a second space 26.

In accordance with an exemplary embodiment, the second half shell 2 can include a fifth insulating barrier 27 and a sixth insulating barrier 28 which extend from one side of the second base wall 12 substantially parallel to each other and to the second vertical side walls 13.

In accordance with an exemplary embodiment, the fifth insulating barrier 27 and the sixth insulating barrier 28 can be adapted to enter the first space 25 and the second space 26, respectively, when the first and second half shells 1, 2 are mutually connected.

In accordance with an exemplary embodiment, a geometrical labyrinth can be created at the central part 3, thus contributing to improve the electrical insulation.

In accordance with an exemplary embodiment, in practice, it has been found that the electrically insulating shell 100 according to the present disclosure can give some significant improvements over known devices according to a solution flexible, quite simple and mechanical sturdy. For example, a very compact solution can be provided, which can be easily adapted to different types of contact pieces or connecting paths. In accordance with an exemplary embodiment, several components, if not all, can be standardized and produced in series, or can include minor size modifications in order to be used.

In accordance with an exemplary embodiment, the electrically insulating shell 100 according to the present disclosure can be suitable for use in switchgear panels, and, for example, when retrofitting already existing switchgear panels. As will be disclosed, the present disclosure also relates to a switchgear panel including a cabinet, a circuit breaker positioned inside the cabinet and suitable to be electrically connected in input and output to an associated electrical circuit along electrically connection paths formed each by one or more conductive pieces, wherein in that it can include at least one electrically insulating shell 100 as described and defined in the appended relevant claims, the at least one insulating shell 100 is operatively positioned along one associated conductive path of the conductive paths so as to electrically insulate a portion of the associated conductive path from the surrounding environment.

Figure 5:
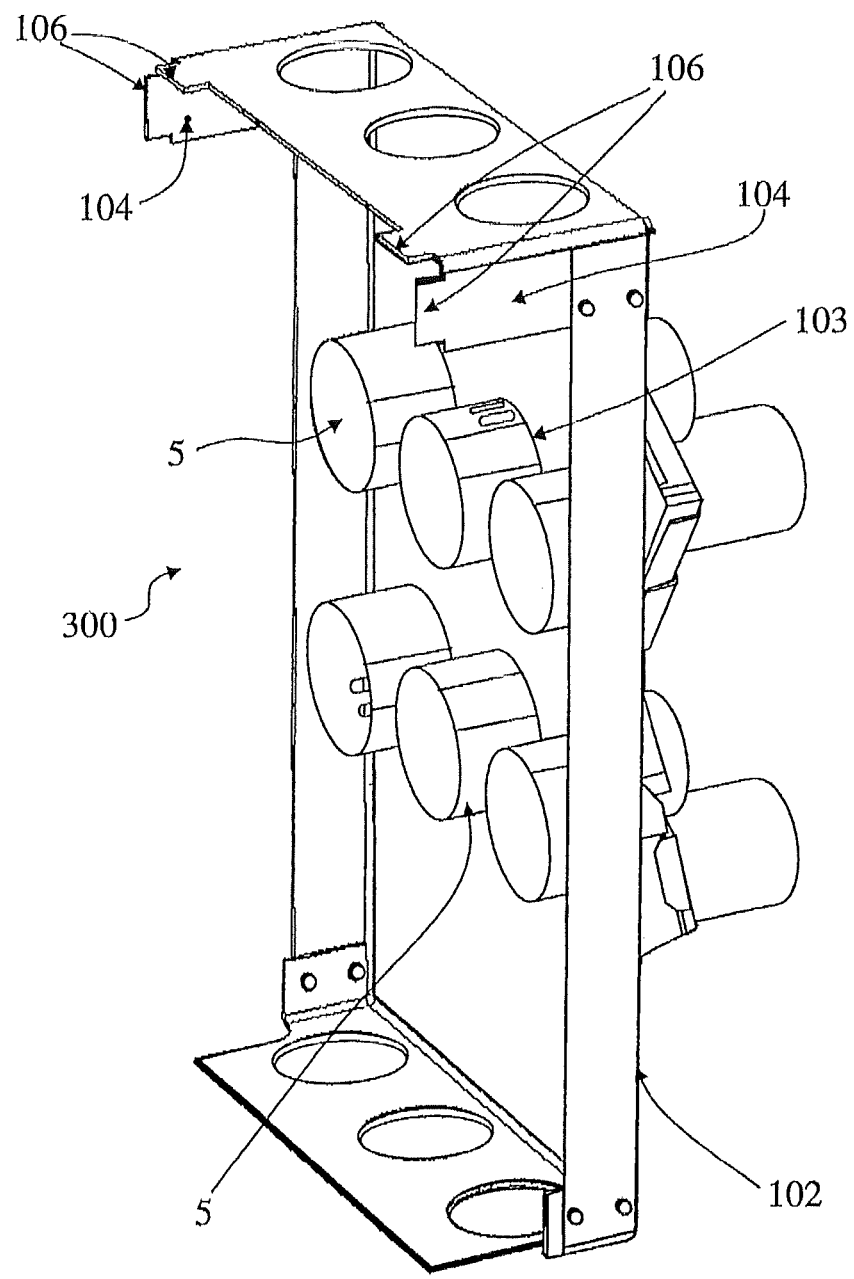
FIG. 5 is a perspective view illustrating an exemplary embodiment of an electrically insulating device according to the present disclosure, including a plurality of insulating shells as the one depicted in FIG. 1.

In accordance with an exemplary embodiment, there could be used one or more of such insulating shells 100 at the same time, and what is more, the insulating shells 100 can be used independently from each other or, as illustrated in the example of FIG. 5, they can be combined with one or more further insulating components in order to contribute forming different types of insulating assemblies for even easier adaption to the specific application.

FIG. 5 illustrates a preferred example of an electrically insulating device 300 which includes an electrically insulating plate 102 having a central part perforated with one or more holes 103 inside each of which the second portion 5 of a corresponding insulating shell 100 is suitable to be inserted and mechanically coupled with the plate 102. Therefore, the present disclosure can also encompass an electrically insulating device 300 wherein in that it includes one or more insulating shells 100 as previously disclosed, and an insulating plate 102 having a central part perforated with one or more holes 103 inside each of which the second portion 5 of a corresponding insulating shell 100 can be suitable to be inserted.

In the example illustrated in FIG. 5, the insulating plate 102 can include one or more side walls 104 which protrude transversally, for example, perpendicularly, from the central part and are adapted to be mechanically connected to another component of a switchgear panel; in the exemplary embodiment of FIG. 5, such side walls 104 are for example defined at the upper part of and are mechanically connected to, for example screwed, the central part of the plate 102.

Figure 6:
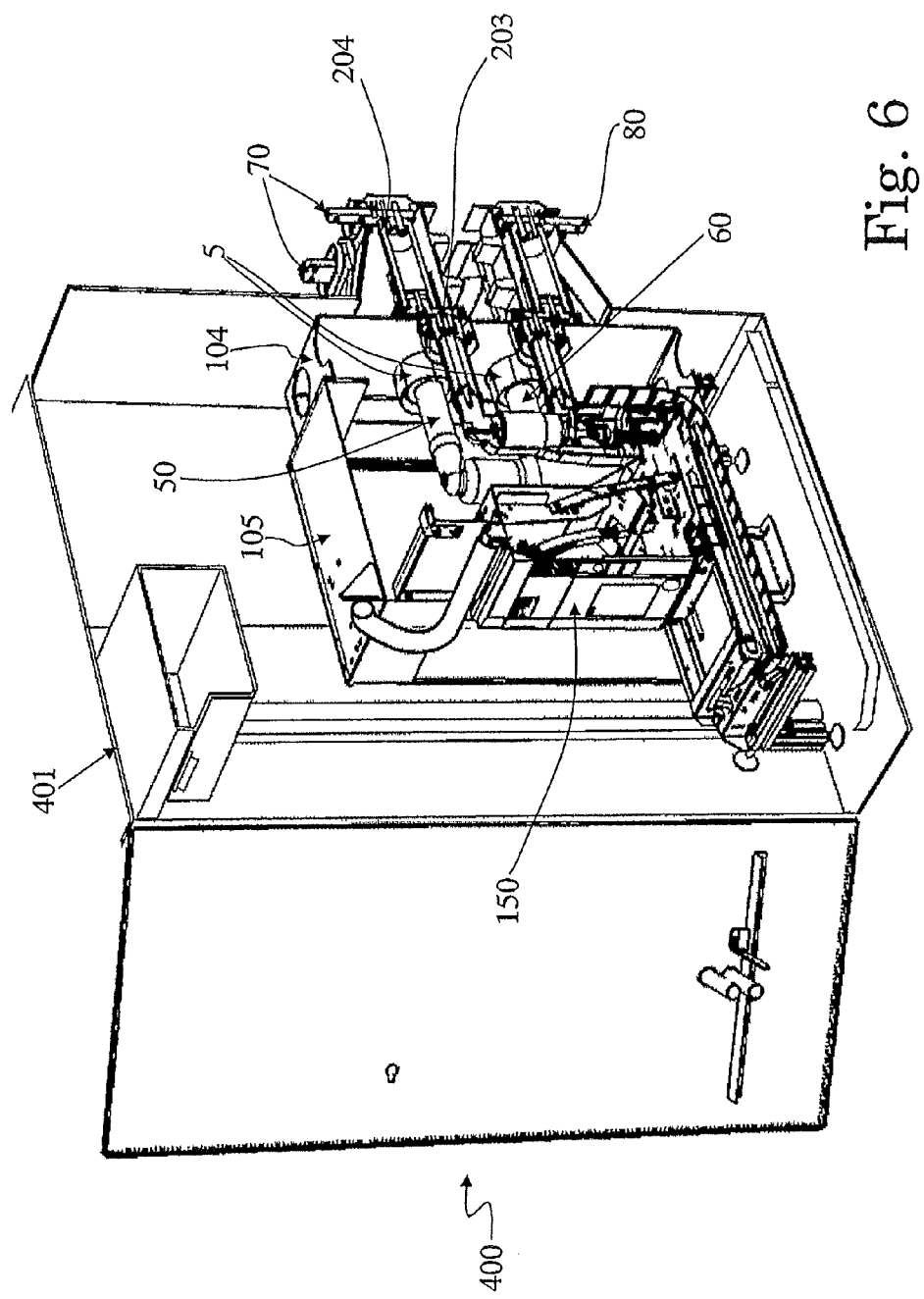
FIG. 6 illustrates an electrical switchgear panel with a circuit breaker connected to the electrically insulating device of FIG. 5.

FIG. 6 illustrates an exemplary embodiment of a switchgear panel 400, which can be also indicated with the equivalent terms of electric switchboard, or simply switchgear or similar definitions. In accordance with an exemplary embodiment, the panel 400 can include a metallic cubicle or cabinet 401 (shown in FIG. 6 partially cut for the sake of better illustrating the internal parts) that can house various apparatuses and equipment, and, for example, a circuit breaker 150. According to a known solution or readily available to those skilled in the art, the circuit breaker 150 can include a plurality of connection contacts 50, 60. In accordance with an exemplary embodiment, each connection contact 50 (or 60) can be suitable to be electrically connected to a corresponding contact piece 70 (or 80) of an associated electrical circuit along a respective connection path formed by one or more conductive pieces suitably shaped, such as, for example, the illustrated conductor pieces 201, 202, 203, 204. For example, the upper contact pieces 70 can be connected to a power source while the lower contact pieces 80 can be connected to a supplied and protected load.

In accordance with an exemplary embodiment, as illustrated, in this case, for each connection between a connection contact 50 (or 60) and the respective piece 70 (or 80) there is provided a corresponding insulating shell 100 (partially visible); each shell 100 is inserted with its portion 5 inside a hole 103 of the insulating plate 102, while the side walls 104 of the plate 102 are connected to a structural element, for example a metallic plate 105 provided inside the cabinet. For example, the protruding teeth 106 of the side walls 104 can be inserted into recesses of the metallic plate 105. In accordance with an exemplary embodiment, in this way, the entire insulating assembly results compact and sturdy and for example a new switchgear panel can be retrofitted with a new, standard and non-modified circuit breaker, even without any particular modification to switchgear panel itself or the insulating device itself. In accordance with an exemplary embodiment, the holes 103 in the insulating plate can be defined in the desired position, while the insulating shells 100, because of their structure can have a certain degree of positioning relative to the plate itself and the associated conductors 200 that they are designed to insulate. In addition, when more shells 100 are used, total space available in the cabinet or among the shells 100 can be increased, as previously described, by adjusting the size and therefore the encumbrance of each shell 100.

In accordance with an exemplary embodiment, inside a switchgear panel, one or more electrically insulating shells 100 cam be used alone, namely without combining them with the insulating plate 102 or any insulating component, for example, in the switchgear panel 400 the shells 100 can be coupled with the associated conductors as illustrated in FIG. 6 but without using the plate 102.

In accordance with an exemplary embodiment, the electrically insulating shell 100, the electrically insulating device 300 and related switchgear panel 400 can be susceptible of modifications and variations, all of which are within the scope of the inventive concept including any combination of the above described embodiments which have to be considered as encompassed by the above description; all details can further be replaced with other technically equivalent elements. In accordance with an exemplary embodiment, the materials, so long as they are compatible with the specific use, as well as the individual components, can be according to the specifications and the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An electrically insulating shell suitable to be operatively associated to an electrical conductor, the electrically insulating shell comprising:
    a first half shell and a second half shell arranged to be mutually connected together and shaped so as to define, once connected together, a closed central part delimiting an inner space, which will encase a corresponding first portion of said electrical conductor;
    a first hollow portion for protruding from a first side of the closed central part, such that the first hollow portion will be in communication with the inner space of the closed central part and adapted to surround a corresponding second portion of the electrical conductor; and
    a second hollow portion for protruding from the closed central part from a second side opposite to the first side, such that the second hollow portion will be in communication with the inner space of the closed central part and adapted to surround a corresponding third portion of the electrical conductor; wherein
    the first half shell and the second half shell include first coupling means and second coupling means, respectively, which mechanically connect the first half shell and the second half shell in a snap-fit way,
    the first half shell comprises a first shaped body having a first base wall, one or more first side walls protruding transversally from the first base wall, the first coupling means including one or more teeth provided on at least one of the one or more first side walls, and the first hollow portion includes a first hollow tubular portion which is made integral with and protrudes perpendicularly from the first base wall in a direction opposite from that of the one or more first side walls, and
    the second half shell comprises a second shaped body having a second base wall, one or more second side walls protruding transversally from the second base wall, the second coupling means including hooks provided on at least one of the one or more second side walls, and the second hollow portion includes a second hollow tubular portion which is made integral with and protrudes perpendicularly from the second base wall in a direction opposite from that of the one or more second side walls.

2. An electrically insulating shell according to claim 1, wherein at least one of the first half shell and the second half shell comprises:
    a plurality of reference notches adapted to allow cutting away portions of a respective one of the first shaped body and the second shaped body.

3. An electrically insulating device according to claim 1, wherein the first half shell comprises:
    a first plurality of reference notches which are provided at least along the first base wall and are adapted to allow rutting away portions of the first shaped body of the first half shell to adjust a length of the first half shell.

4. An electrically insulating shell according to claim 1, wherein the first half shell comprises:
    a first plurality of centering fins provided on an inner surface of the first hollow tubular portion.

5. An electrically insulating shell according to claim 1, wherein the second hollow tubular portion comprises:
    a bottom wall having a central portion comprising a main hole, the bottom wall including one or more notches to cut away the central portion including the main hole.

6. An electrically insulating shell according to claim 5, wherein the second half shell comprises:
    a plurality of reference notches which are provided at least along the second base wall and are adapted to allow cutting away portions of the second shaped body of the second half shell to adjust a length of the second half shell.

7. An electrically insulating shell according to claim 1, wherein the second half shell comprises:
    a plurality of reference notches which are provided at least along the second base wall and are adapted to allow cutting away portions of the second shaped body of the second half shell to adjust a length of the second half shell.

8. An electrically insulating shell according to claim 1, wherein the first half shell comprises:
    a first insulating barrier, a second insulating barrier, a third insulating barrier, and a fourth insulating barrier, each of the first, second, third and fourth insulating barriers extending from one side of the first base wall substantially parallel to each other and to the first side walls, the first and second insulating barriers being positioned close to and spaced apart from each other of a first space, the third and fourth insulating barriers being positioned close to and spaced apart from each other of a second space, and the second half shell includes a fifth insulating barrier and a sixth insulating barrier which extend from one side of the second base wall substantially parallel to each other and to the second side walls, the fifth insulating barrier and the sixth insulating barrier being adapted to enter the first space and the second space, respectively, when the first and second half shells are mutually connected.

9. An electrically insulating device comprising:
    one or more insulating shells, the one or more insulating shells including:
    a first half shell and a second half shell arranged to be mutually connected together and shaped so as to define, once connected together, a closed central part delimiting an inner space, which will encase a corresponding first portion of an electrical conductor;
a first hollow portion for protruding from a first side of the closed central part, such that the first hollow portion will be in communication with the inner space of the closed central part and adapted to surround a corresponding second portion of the electrical conductor; and
a second hollow portion for protruding from the closed central part from a second side opposite to the first side, such that the second hollow portion will be in communication with the inner space of the closed central part and adapted to surround a corresponding third portion of the electrical conductor; and
an insulating plate having a central portion perforated with one or more holes inside, and wherein each of the one or more holes receives the second hollow portion of a corresponding insulating shell of the one or more insulating shells; wherein
the first half shell and the second half shell include first coupling means and second coupling means, respectively, which mechanically connect the first half shell and the second half shell in a snap-fit way,
the first coupling means includes one or more teeth provided on one or more first-side walls of the first half shell, and
the second coupling means includes one or more hooks provided on one or more second side walls of the second half shell and each structured to engage a corresponding one of the one or more teeth.

10. An electrically insulating device according to claim 9, wherein the insulating plate comprises: one or more side walls which protrude transversally from the central portion and are adapted to be mechanically connected to another component.

11. A switchgear panel comprising:
a cabinet;
a circuit breaker positioned inside the cabinet and electrically connected via an input and an output to an associated electrical circuit along electrical connection paths each formed by one or more conductive pieces;
at least one electrically insulating shell, the at least one electrically insulating shell including:
a first half shell and a second half shell mutually connected together and shaped so as to define, once connected together, a closed central part delimiting an inner space, which encases a corresponding first portion of an electrical conductor;
a first hollow portion for protruding from a first side of the closed central part, such that the first hollow portion is in communication with the inner space of the closed central part and adapted to surround a corresponding second portion of said electrical conductor; and
a second hollow portion for protruding from the closed central part from a second side opposite to the first side, such that the second hollow portion is in communication with the inner space of the closed central part and adapted to surround a corresponding third portion of said electrical conductor; and
wherein the at least one insulating shell is positioned along one of the electrical connection paths so as to electrically insulate at least a portion of said one of the electrical connection paths from a surrounding environment, and
the first half shell and the second half shell include first coupling means and second coupling means, respectively, which mechanically connect the first half shell and the second half shell, the first coupling means includes one or more teeth, the second coupling means includes one or more hooks each structured to engage with a corresponding one of the one or more teeth.

12. A switchgear panel according to claim 11, wherein, the first half shell comprises:
a shaped body having a first base wall, one or more first side walls protruding transversally from the first base wall;
the first coupling means including the one or more teeth provided on at least one of the one or more first side walls; and
the first hollow portion includes a first hollow tubular portion which is made integral with and protrudes perpendicularly from the first base wall in a direction opposite from that of the one or more first side walls.

13. A switchgear panel according to claim 12, wherein the first half shell comprises:
a first plurality of reference notches which are provided at least along the first base wall and are adapted to allow cutting away portions of the shaped body of the first half shell to adjust a length of the first half shell.

14. A switchgear panel according to claim 11, wherein the second half shell comprises:
a shaped body having a second base wall, one or more second side walls protruding transversally from the second base wall,
the second coupling means including the hooks provided on at least one of the one or more second side walls, and
the second hollow portion includes a second hollow tubular portion which is made integral with and protrudes perpendicularly from the second base wall in a direction opposite from that of the one or more second side walls.

15. A switchgear panel according to claim 11, wherein the first half shell comprises:
a first insulating barrier, a second insulating barrier, a third insulating barrier, and a fourth insulating barrier, each of the first, second, third and fourth insulating barriers extending from one side of the first base wall substantially parallel to each other and to the first side walls, the first and second insulating barriers being positioned close to and spaced apart from each other of a first space, the third and fourth insulating barriers being positioned close to and spaced apart from each other of a second space, and the second half shell includes a fifth insulating barrier and a sixth insulating barrier which extend from one side of the second base wall substantially parallel to each other and to the second side walls, the fifth insulating barrier and the sixth insulating barrier being adapted to enter the first space and the second space, respectively, when the first and second half shells are mutually connected.

16. A switchgear panel comprising: a cabinet; a circuit breaker positioned inside the cabinet and having a plurality of connection contacts to be electrically connected each to a corresponding contact piece of an associated electrical circuit along a respective connection path formed by one or more conductive pieces; and
an electrically insulating device, the electrically insulating device including:
one or more insulating shells, the one or more insulating shells including: a first half shell and a second half shell mutually connected together and shaped so as to define a closed central part delimiting an inner space, encasing a corresponding first portion of an electrical conductor;

a first hollow portion for protruding from a first side of the closed central part, such that the first hollow portion is in communication with the inner space of the closed central part and adapted to surround a corresponding second portion of the electrical conductor; and a second hollow portion for protruding from the closed central part from a second side opposite to the first side, such that the second hollow portion is in communication with the inner space of the closed central part and adapted to surround a corresponding third portion of the electrical conductor; and an insulating plate having a central portion perforated with one or more holes inside each of which the second hollow portion of a corresponding insulating shell is inserted; and wherein the insulating plate includes one or more side walls which protrude transversally from the central portion, and which are mechanically connected to a further component of the switch gear panel, and the first half shell and the second half shell include a first coupling structure and second coupling structure, respectively, which mechanically connect the first half shell and the second half shell, the first coupling structure comprises one or more teeth, and the second coupling structure comprises one or more hooks each structured to engage with a corresponding one of the one or more teeth.

\* \* \* \* \*